US012746585B2

(12) United States Patent
Draganic

(10) Patent No.: US 12,746,585 B2
(45) Date of Patent: Sep. 29, 2026

(54) DEVICE AND METHOD FOR THE FLUID FLOW-BASED CLEANING OF MOUTHPIECES AND/OR HOSES OF A SHISHA

(71) Applicant: Design my Concept Projektverwaltungs GmbH, Nuremberg (DE)

(72) Inventor: Alexander Draganic, Nuremberg (DE)

(73) Assignee: Design my Concept Projektverwaltungs GmbH, Nuremberg (DE)

( * ) Notice: Subject to any disclaimer, the term of this patent is extended or adjusted under 35 U.S.C. 154(b) by 0 days.

(21) Appl. No.: 18/713,363

(22) PCT Filed: Nov. 11, 2022

(86) PCT No.: PCT/EP2022/081598
§ 371 (c)(1),
(2) Date: May 24, 2024

(87) PCT Pub. No.: WO2023/094178
PCT Pub. Date: Jun. 1, 2023

(65) Prior Publication Data

US 2025/0018448 A1 Jan. 16, 2025

(30) Foreign Application Priority Data

Nov. 26, 2021 (DE) ..................... 10 2021 131 154.3

(51) Int. Cl.
*B08B 11/02* (2006.01)
*A24F 1/30* (2006.01)
*B08B 9/032* (2006.01)
*B08B 9/027* (2006.01)

(52) U.S. Cl.
CPC ................ *B08B 11/02* (2013.01); *A24F 1/30* (2013.01); *B08B 9/0321* (2013.01); *B08B 9/027* (2013.01)

(58) Field of Classification Search
CPC ......... A24F 1/30; B08B 9/027; B08B 9/0321; B08B 11/02
See application file for complete search history.

(56) References Cited

U.S. PATENT DOCUMENTS

2007/0261194 A1* 11/2007 Tannous .................... A24F 1/30 15/301

FOREIGN PATENT DOCUMENTS

| | | | |
|---|---|---|---|
| DE | 102016115180 | 11/2017 | |
| DE | 102019202139 | 8/2020 | |
| DE | 202020004692 | 11/2020 | |
| DE | 102020110117 | 10/2021 | |
| DE | 102020110547 | 10/2021 | |
| DE | 102020007355 A1 * | 6/2022 | ............. A24F 47/00 |
| WO | WO-2008127259 A1 * | 10/2008 | ............... A24F 1/30 |

OTHER PUBLICATIONS

Machine Translation of DE 202020004692 to Luehr, Nov. 2020. (Year: 2020).*

(Continued)

*Primary Examiner* — Benjamin L Osterhout
(74) *Attorney, Agent, or Firm* — Dority & Manning, P.A.

(57) ABSTRACT

Device and method for fluid flow-based cleaning of mouthpieces and/or pipes of a shisha.

12 Claims, 2 Drawing Sheets

(56) References Cited

OTHER PUBLICATIONS

Figure 1:
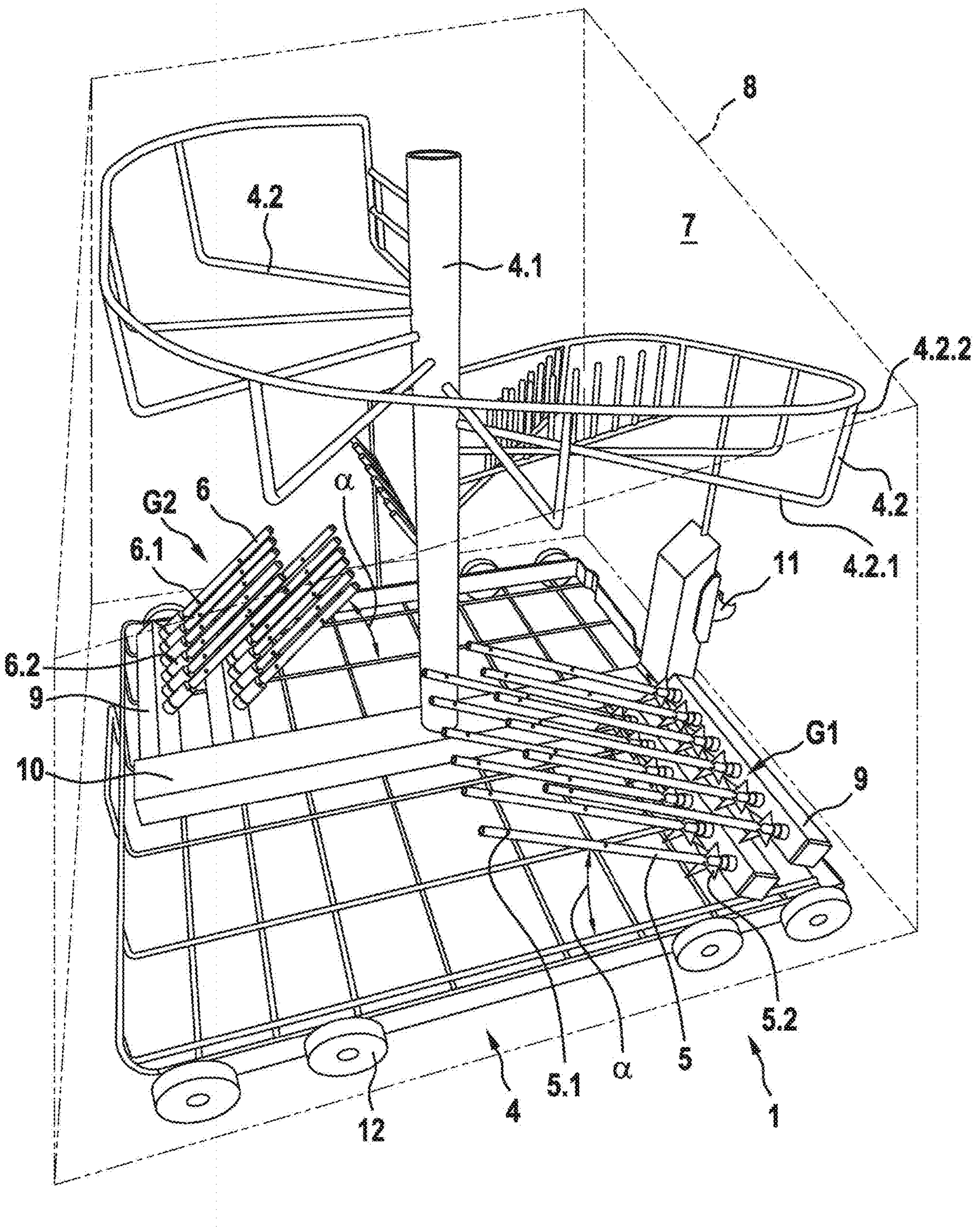

PCT International Search Report (with English translation) for corresponding PCT Application No. PCT/EP2022/081598, mailed Mar. 6, 2023, 7 pages.
Written Opinion of the International Searching Authority for corresponding PCT Application No. PCT/EP2022/081598, dated Mar. 6, 2023, 10 pages.

* cited by examiner

DEVICE AND METHOD FOR THE FLUID FLOW-BASED CLEANING OF MOUTHPIECES AND/OR HOSES OF A SHISHA

CROSS-REFERENCE TO RELATED APPLICATIONS

This application is the U.S. National Stage entry of International Application No. PCT/EP2022/081598, filed on Nov. 11, 2022, which, in turn, claims priority to German Patent Application No. 10 2021 131 154.3, filed on Nov. 26, 2021, both of which are hereby incorporated herein by reference in their entireties for all purposes.

The invention relates to a device and method for fluid flow-based cleaning of mouthpieces and/or pipes of a shisha.

The consumption of shishas, which can be commonly also referred to as water pipes or hookahs, has long enjoyed growing popularity, both in the private and in the commercial sphere.

In order to use shishas again and again, certain hygiene provisions should be or are to be observed, which of course also includes cleaning the shishas or the parts thereof, such as the mouthpieces and/or pipes.

Hitherto, cleaning in particular of the mouthpieces and the pipes of shishas was carried out by manual rinsing.

Therefore, hitherto, hygienic cleaning in particular of the mouthpieces and the pipes of shishas proved to be comparatively complex and inefficient, since no devices were available for fluid flow-based cleaning of mouthpieces and/or pipes of a shisha, which ensured automatable or automatic, and at the same time hygienic, cleaning.

Proceeding herefrom, the object of the present invention is that of specifying a device for fluid flow-based cleaning of mouthpieces and/or pipes of a shisha, which enables improved cleaning which in particular also satisfies the high hygiene standards, for example in the catering trade, the hotel industry, etc.

The object is achieved by the subjects of the independent claims. The claims dependent thereon relate to possible embodiments of the subjects of the independent claims.

A first aspect of the invention relates to a device for fluid flow-based cleaning of mouthpieces and/or pipes of a shisha. The device is accordingly configured for fluid flow-based cleaning of mouthpieces and/or pipes, i.e. in particular in general components that are hollow cylindrical at least in portions, of a shisha.

The term "fluid flow-based cleaning" is to be understood in particular such that, for cleaning the mouthpieces, a fluid, i.e. a gas and/or a liquid, that is optionally provided with cleaning substances and is optionally temperature-controlled, can be or is used, which fluid flows around or through the components of a shisha that are to be cleaned, one or more times, optionally in a pressurized manner, as a result of which impurities, such as deposits of smoked matter, germs, etc. are detached.

The device comprises a basket-like frame construction for storing mouthpieces and/or pipes of a shisha that are to be cleaned in a fluid flow-based manner. The basket-like frame construction comprises one or more receiving elements, which are strut-like or strut-shaped and thus have an elongate basic shape, for receiving a mouthpiece and/or pipe of a shisha that is to be cleaned in a fluid flow-based manner (referred to in the following as components of a shisha that are to be cleaned). The strut-like or strut-shaped receiving elements are thus each configured to receive at least one component of a shisha that is to be cleaned, and to store them in a stable manner, in a spatial arrangement or orientation that is expedient in view of the geometry of the components of the shisha that are to be cleaned and/or the portions thereof that are to be cleaned, which are to be understood to include in particular interior spaces of the typically hollow cylindrical components, in the context of a fluid flow-based cleaning process, i.e. for example a rinsing process, which can be or is carried out by means of the device. For this purpose, the strut-like receiving elements can be or are arranged at an angle of between 5° and 45° relative to a horizontally oriented reference plane, which can be defined for example by an open or closed base surface of the basket-like frame construction. Specifically, the strut-like receiving elements can be or are arranged within the above-mentioned boundaries of 5° and 45°, i.e. for example at an angle of 5°, 10°, 15°, 20°, 25°, 30°, 35° or 40°. The values mentioned above can also be understood as upper and lower limit values of an angular range. All the values between the above-mentioned values, e.g. 7°, 12°, 29°, are also included.

The angular arrangement possibility or arrangement of the strut-like receiving elements can take place e.g. via at least one carrier portion (not explained in greater detail) on a base region of the basket-like frame construction, or above the base region. Optionally, a plurality of correspondingly angularly arranged strut-like receiving elements can also be provided in a plurality of planes one above the other, for example in order to increase the packing density of corresponding mouthpieces and/or pipes.

The angular arrangement possibility or arrangement of the strut-like receiving elements enables the mentioned expedient spatial arrangement or orientation and stable storage of respective components of a shisha that are to be cleaned. The angular arrangement possibility or arrangement of the strut-like or strut-shaped receiving elements furthermore makes it possible to also store comparatively long components of a shisha, such as mouthpieces or pipes of a length of at least 15 cm, in a manner that is expedient in view of the efficiency of the cleaning process and the space requirement for the storage, since the mouthpieces and/or pipes that are typically pushed onto respective strut-like or strut-shaped receiving elements, at least in portions, can be or are stored in a manner oriented obliquely in space, at least in portions, following the angular arrangement or orientation of the strut-like or strut-shaped receiving elements. This typically also ensures that a cleaning fluid collects inside the mouthpieces or pipes in an undesired manner.

In addition to the described basket-like frame construction, the device also comprises a receiving device that is configured as a receiving chamber for receiving the basket-like frame construction. The receiving chamber of the receiving device, which can typically be closed, as required, by an e.g. flap-like closure element, is typically configured in a sealed manner, such that a cleaning fluid can flow therethrough during operation of the device.

The receiving device can be formed for example by a rinsing machine, or can form such a component. The receiving device can accordingly comprise a controller for controlling rinsing processes. The controller can communicate with a data memory in which various rinsing programs are stored which can be distinguished from one another by the parameters influencing the cleaning process, i.e. for example parameters relating to the cleaning fluid, such as pressure, temperature, chemical composition, etc., and/or parameters relating to the actual cleaning process, such as the duration of the cleaning process. The controller can likewise be connectable or connected to an output device, via which information relating to a respective cleaning process can be output, for example for documentation purposes. The term "output" includes both physical and non-physical outputting of corresponding information at an output interface, such as a printer, a display, etc., as well as the data-related transmission of corresponding information to a communication partner.

In particular, the described angular arrangement possibility or arrangement of the strut-like or strut-shaped receiving elements provides a device for fluid flow-based cleaning at least of mouthpieces and/or pipes of a shisha, which enables improved cleaning of components of the shisha which in particular also satisfies the high hygiene standards, for example in the catering trade, the hotel industry, etc.

In an embodiment of the device, at least one strut-like or strut-shaped receiving element can be able to be arranged in a plurality of different angled orientations, so as to be adjustable relative to the horizontally oriented reference plane. The respective strut-like or strut-shaped receiving element can accordingly be adjusted in its spatial orientation, and thus be transferred into different angular orientations relative to the horizontally oriented reference plane. The flexibility of the spatial orientation, provided in this way, of a plurality of or all of the strut-like or strut-shaped receiving elements makes it possible for storage and cleaning that is as optimum as possible to be achieved, with respect to the dimensions of the components of a shisha that are to be cleaned in each case, i.e. in particular the length thereof.

The respective receiving element(s) that can be arranged so as to be adjustable relative to the horizontally oriented reference plane, in a plurality of different angular orientations, can be associated with at least one locking device, which is configured to lock the respective strut-like or strut-shaped receiving element(s) in the respective orientations, and thus secure it/them against uncontrolled adjustment, in particular by form-fitting and/or force-fitting interaction, i.e. for example latching interaction, with a portion of the respective strut-like or strut-shaped receiving element.

In a further embodiment of the device, the strut-like or strut-shaped receiving elements can each comprise a flow channel structure through which a cleaning fluid can flow, and one or more outlet openings which communicate with the flow channel structure and which are in particular hole-like or hole-shaped, or slit-like or slit-shaped, and via which a cleaning fluid flowing through the flow channel structure can escape. Thus, a cleaning fluid can be able to flow through the receiving elements, through the flow channel structure typically comprising one or more flow channels that pass through the respective receiving element, in particular in the longitudinal direction. Respective outlet openings can be arranged or formed at different axial and/or peripheral direction-related positions with respect to a longitudinal axis of the respective strut-like or strut-shaped receiving elements. In particular, an axially oriented outlet opening at or in the region of a free end of a respective strut-like or strut-shaped receiving element is also conceivable. Respective outlet openings can be arranged or formed so as to extend, in particular in a uniformly or non-uniformly distributed manner, at least in portions, optionally completely, over a respective strut-like or strut-shaped receiving element. In this way, a desired cleaning effect for different components of a shisha that are to be cleaned can be ensured.

In a further embodiment of the device, the strut-like receiving elements can be of a length in a range between 10 cm and 50 cm, in particular in a range between 10 cm and 45 cm, in particular between 10 and 40 cm, more particularly between 10 cm and 35 cm, more particularly in a range between 10 cm and 30 cm, more particularly in a range between 10 cm and 25 cm, more particularly in a range between 10 and 20 cm. In this way, the stable storage, already referred to above, as well as—in particular in conjunction with the mentioned expedient arrangement and cleaning—of respective components of a shisha that are to be cleaned is possible.

In a further embodiment of the device, the strut-like or strut-shaped receiving elements can be configured, in the region of an end remote from a free end, having an enlarged cross-sectional geometry that forms a clamping or bracing portion for clamping or bracing a mouthpiece and/or pipe of a shisha that is to be cleaned. An enlarged cross-sectional geometry of respective strut-like or strut-shaped receiving elements can be implemented in particular by an enlargement of the outside diameter; a respective strut-like or strut-shaped receiving element can accordingly have at least two different outside diameters and thus at least two different cross-sectional geometries.

At this point, it should be noted, in a general manner, that the outside diameter of the strut-like or strut-shaped receiving elements, which, as mentioned, are typically configured having a rotationally symmetrical basic shape, can be e.g. in a range between 1 and 15 mm, in particular in a range between 3 and 10 mm, more particularly in a range between 5 and 10 mm. The outside diameter of the strut-like or strut-shaped receiving elements can be selected in particular on the basis of the inside diameter of the respective components of a shisha that are to be received in each case, as mentioned, in particular by being pushed on. This can optionally also mean a certain oversize or undersize of the outside diameter relative to the inside diameter of respective components of a shisha that are to be received in each case, as mentioned, in particular by being pushed on.

In a further embodiment of the device, the strut-like or strut-shaped receiving elements can be configured, in the region of an end remote from a free end, having a stop element that forms a stop surface for a mouthpiece and/or pipe of a shisha that is to be cleaned and that is received on the respective receiving element. Providing corresponding stop elements also contributes to stable storage of the components of a shisha that are to be cleaned.

In a further embodiment of the device, a plurality of receiving elements can be arranged side-by-side on a carrier portion, in at least one row, forming a receiving element group. This results in an arrangement of the strut-like or strut-shaped receiving elements which is particularly expedient in view of practical fitting of the basket-like frame construction with components of a shisha that are to be cleaned.

In a further embodiment of the device, the at least one carrier portion, which can optionally also be referred to as a carrier arm, can comprise a flow channel structure through which a cleaning fluid can flow. Therefore, a cleaning fluid can also be able to flow through the at least one carrier portion.

In a further embodiment of the device, the flow channel structure on the carrier portion side can communicate with at least one flow channel structure on the receiving element side.

In a further embodiment of the device, the at least one carrier portion can be arranged or formed on a base portion of the basket-like frame construction, wherein the base portion comprises a flow channel structure through which a cleaning fluid can flow.

In a further embodiment of the device, the flow channel structure on the base portion side can communicate with at least one flow channel structure on the carrier portion side.

The above-mentioned embodiments make it possible to implement a superordinate flow channel structure which passes through the basket-like frame construction at least in portions, since a respective carrier portion likewise comprises a flow channel structure through which a cleaning fluid can flow, which structure can communicate with respective flow channel structures on the receiving element side, such that a cleaning fluid flowing through the flow channel structure on the carrier portion side can flow from the flow channel structure on the carrier portion side into at least one flow channel structure on the receiving element side. The flow channel structure on the carrier element side can accordingly serve as a distributor structure with respect to the flow channel structures on the receiving element side.

As mentioned, a respective carrier portion can in turn be arranged or formed on a base portion of the frame construction. The base portion can accordingly also comprise a flow channel structure through which a cleaning fluid can flow. The flow channel structure on the base portion side can communicate with a respective flow channel structure on the carrier portion side, such that a cleaning fluid flowing through the flow channel structure on the base portion side can flow from the flow channel structure on the base portion side into at least one flow channel structure on the carrier portion side. The flow channel structure on the base portion side can accordingly serve as a distributor structure with respect to the flow channel structures on the carrier portion side. The flow channel structure on the base portion side can comprise a central inflow opening for inflow of a cleaning fluid into the flow channel structure on the base portion side, and further into the flow channel structures on the carrier portion side, which communicate directly or indirectly therewith, and correspondingly into the flow channel structures on the receiving element side.

In a further embodiment of the device, said device can comprise a first receiving element group which comprises a plurality of receiving elements that are arranged side-by-side on a first carrier portion in at least one row, in a first angular orientation, and at least one second receiving element group which comprises a plurality of receiving elements that are arranged side-by-side on a second carrier portion in at least one row, in a first angular orientation. The first receiving element group can be arranged on a first side of a base portion, in particular in the region of a first free end of the base portion. The second receiving element group can be arranged on a second side of the base portion that is opposite the first side, in particular in the region of a second free end of the base portion opposite the first free end. This results in an arrangement of the strut-like receiving elements that is expedient with respect to space requirements and cleaning efficiency.

In a further embodiment, the basket-like frame construction can comprise a plurality of frame elements (these can also be referred to as auxiliary frame elements) which are arranged in an angled manner, in particular in a right-angled manner, on a vertically oriented rod-like or rod-shaped frame element, in particular in a spiral staircase-like manner, at different axial and/or peripheral direction-related positions with respect to a frame element axis defined by the rod-shaped or rod-like frame element. Respective frame elements can comprise first frame element portions which extend at an angle, in particular at a right angle or substantially at a right angle, relative to the frame element axis, and second frame element portions which extend in parallel or substantially in parallel relative to the frame element axis. Respective frame elements can accordingly have an L-like or L-shaped basic shape. In this way, the coil-like or spiral staircase-like arrangement of respective frame elements efficiently provides space for the storage of pipes of a shisha since these can be stored in a coil-like manner over a plurality of spatial planes. In this case, it is notable that at least one free end of a respective pipe can, as mentioned, be arranged on a corresponding receiving element, for example by being pushed on.

In a further embodiment of the device, the basket-like frame construction can comprise one or more wheel or roller elements, via which the basket-like frame construction can be movably mounted on a substrate for example. Corresponding wheel or roller elements typically also make it possible for the basket-like frame construction to be moved into and out of the receiving chamber of the receiving device. In an analogous manner, optionally telescopic rail elements can also be arranged or formed on the basket-like frame construction.

In a further embodiment of the device, the receiving elements can be formed of a rust-proof metal, in particular a rust-proof iron-based metal, preferably a stainless steel. The receiving elements thus have sufficient stability, meet hygiene requirements, and are passivated with respect to corresponding cleaning fluids.

Of course, individual, a plurality of or all of the above-described embodiments of the device can be combined with one another.

A second aspect of the invention relates to a corresponding basket-like frame construction for a device according to the first aspect of the invention. All that has been stated above in connection with the device applies analogously for the frame construction.

A third aspect of the invention relates to a method for cleaning at least one mouthpiece and/or pipe of a shisha. The method is characterized in that a device according to the first aspect of the invention, a basket-like frame construction according to the second aspect of the invention is used for carrying out the method. Within the context of the method, in particular an optionally temperature-controlled cleaning fluid flows through at least the flow channel structure of the receiving elements. All that has been stated above in connection with the device and the frame construction applies analogously for the method.

Figure 2:
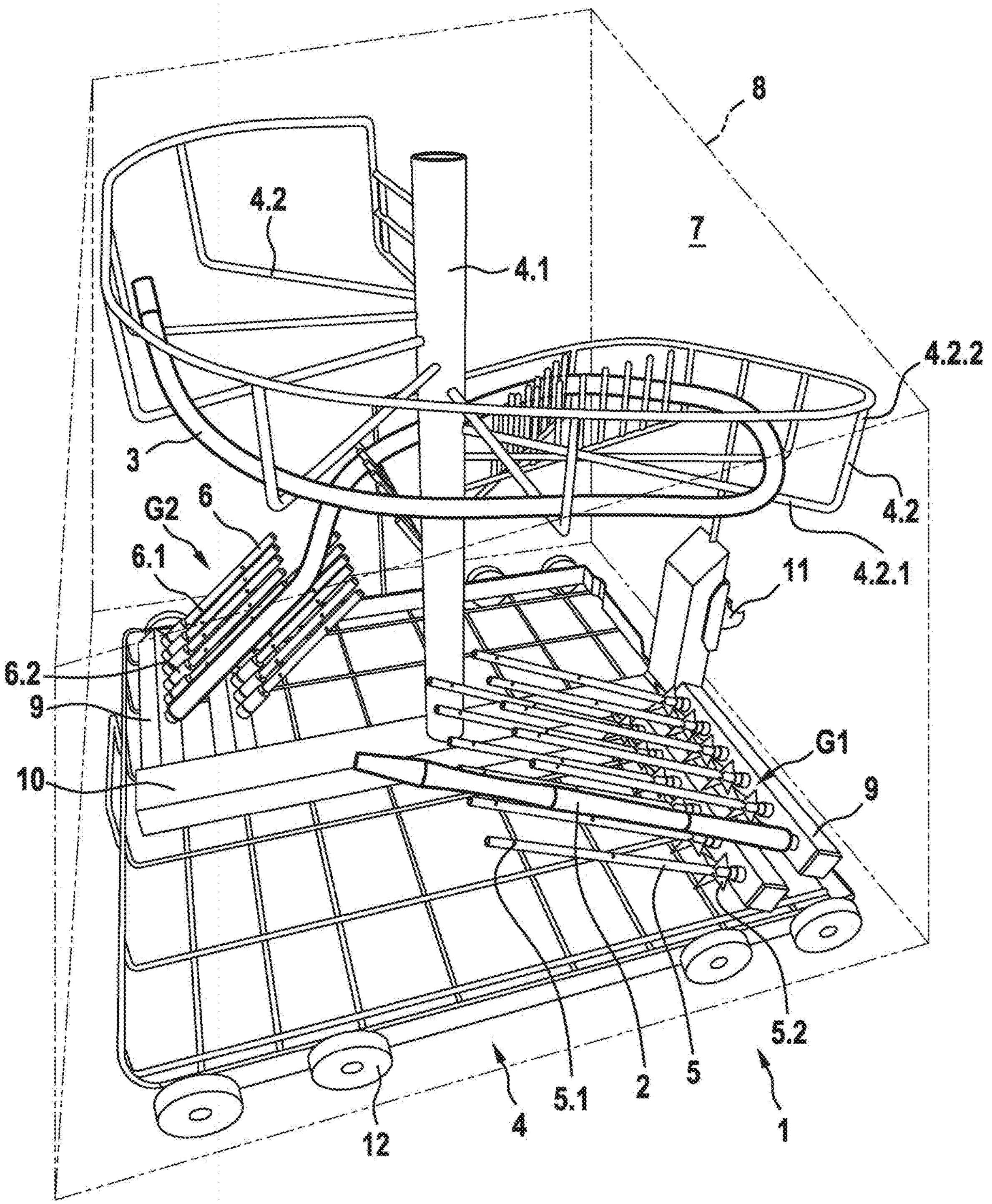

The invention is explained with reference to embodiments in the drawings, in which:

FIG. 1 and FIG. 2 are each schematic views of a device for fluid flow-based cleaning of mouthpieces and/or pipes of a shisha according to one embodiment.

FIGS. 1 and 2 are each schematic perspective views of a device 1 for fluid flow-based cleaning e.g. of mouthpieces 2 and/or pipes 3 of a shisha according to an embodiment. The figures differ in that the device 1, i.e. a basket-like frame construction 4 forming a component of the device 1, is equipped only in FIG. 2 with a mouthpiece 2 of a shisha that is to be cleaned in a fluid flow-based manner, and a pipe 3 of a shisha that is to be cleaned in a fluid flow-based manner. The mouthpiece 2 and the pipe 3 are components, by way of example, of a shisha that are to be cleaned in a fluid flow-based manner.

The device 1 comprises the above-mentioned basket-like frame construction 4 which is configured for storing mouthpieces 2 and/or pipes 3 of a shisha that are to be cleaned in a fluid flow-based manner, during a fluid flow-based cleaning process. The frame construction 4 comprises one or more receiving elements 5, 6, e.g. formed of stainless steel, which are strut-like or strut-shaped and thus have an elongate basic shape, for receiving a mouthpiece 2 and/or pipe 3 of a shisha that is to be cleaned in a fluid flow-based manner (referred to in the following as components of a shisha that are to be cleaned). The receiving elements 5, 6 are thus each configured to receive at least one component of a shisha that is to be cleaned, and to store them in a stable manner, in a spatial arrangement or orientation that is expedient in view of the geometry of the components of the shisha that are to be cleaned and/or the portions thereof that are to be cleaned, which are to be understood to include in particular interior spaces of the typically hollow cylindrical components, in the context of a fluid flow-based cleaning process, i.e. for example a rinsing process, which can be or is carried out by means of the device 1. For this purpose, the strut-like receiving elements 5, 6 can be or are arranged at an angle α of between 5° and 45° relative to a horizontally oriented reference plane, which can be defined for example by an open or closed base surface of the basket-like frame construction 4. Specifically, the strut-like receiving elements 5, 6 can be or are arranged within the above-mentioned boundaries of 5° and 45°, i.e. for example at an angle α of 5°, 10°, 15°, 20°, 25°, 30°, 35° or 40°.

As FIG. 2 shows, the angular arrangement possibility or arrangement of the strut-like receiving elements 5, 6 enables the mentioned expedient spatial arrangement or orientation and stable storage of respective components of a shisha that are to be cleaned. The angular arrangement possibility or arrangement of the strut-like receiving elements 5, 6 furthermore makes it possible to also store comparatively long components of a shisha, such as mouthpieces 2 and pipes of a length of at least 15 cm, in a manner that is expedient in view of the efficiency of the cleaning process and the space requirement for the storage, since, as FIG. 2 shows, the mouthpieces 2 and/or pipes 3 that are pushed on along respective strut-like receiving elements 5, 6, at least in portions, can be or are stored in a manner arranged obliquely in space, at least in portions, following the angular arrangement or orientation of the strut-like receiving elements 5, 6. This typically also ensures that a cleaning fluid collects inside the mouthpieces 2 or pipes 3 in an undesired manner.

The strut-like receiving elements 5, 6 can be of a length in a range between 10 cm and 40 cm, in particular a length of over 15 cm. In this way, the stable storage, already referred to, as well as—in particular in conjunction with the mentioned expedient arrangement and cleaning—of respective components of a shisha that are to be cleaned is possible.

The device 1 also comprises—as indicated merely schematically in the figures—in addition to the basket-like frame construction 4, a receiving device 8 that is configured as a receiving chamber 7 for receiving the basket-like frame construction 4. The receiving chamber 7 of the receiving device 8, which can typically be closed, as required, by an e.g. flap-like closure element (not shown), is typically configured in a sealed manner, such that a cleaning fluid can flow therethrough during operation of the device 1.

The receiving device 8 can be formed by a rinsing machine, or can form such a component. The receiving device 8 can accordingly comprise a controller (not shown) for controlling rinsing processes. The controller can communicate with a data memory (not shown) in which various rinsing programs are stored which can be distinguished from one another by the parameters influencing the cleaning process, i.e. for example parameters relating to the cleaning fluid, such as pressure, temperature, chemical composition, etc., and/or parameters relating to the actual cleaning process, such as the duration of the cleaning process. The controller can likewise be connectable or connected to an output device (not shown), via which information relating to a respective cleaning process can be output, for example for documentation purposes. The term "output" includes both physical and non-physical outputting of corresponding information at an output interface, such as a printer, a display, etc., as well as the data-related transmission of corresponding information to a communication partner.

The angular arrangement possibility or arrangement, shown in the figures, of the strut-like receiving elements 5, 6 provides a device 1 for fluid flow-based cleaning of mouthpieces 2 and/or pipes 3 of a shisha, which enables improved cleaning of components of the shisha which in particular also satisfies the high hygiene standards, for example in the catering trade, the hotel industry, etc.

At least one strut-like or strut-shaped receiving element 5, 6 can be able to be arranged in a plurality of different angled orientations, so as to be adjustable relative to the horizontally oriented reference plane. The respective receiving element 5, 6 can accordingly be adjusted in its spatial orientation, and thus be transferred into different angular orientations relative to the horizontally oriented reference plane. The flexibility of the spatial orientation, provided in this way, of a plurality of or all of the strut-like receiving elements 5, 6 makes it possible for storage and cleaning that is as optimum as possible to be achieved, with respect to the dimensions of the components of a shisha that are to be cleaned in each case, i.e. in particular the length thereof.

The respective receiving element(s) 5, 6 that can be arranged so as to be adjustable relative to the horizontally oriented reference plane, in a plurality of different angular orientations, can be associated with at least one locking device (not shown), which is configured to lock the respective receiving elements 5, 6 in the respective orientations, and thus secure them against uncontrolled adjustment, in particular by form-fitting and/or force-fitting interaction, i.e. for example latching interaction, with a portion of the receiving element 5, 6.

In the embodiment, the strut-like receiving elements 5, 6 each comprise a flow channel structure through which a cleaning fluid can flow, and a plurality of outlet openings 5.1, 6.1 which communicate with the flow channel structure and which are in particular hole-like or hole-shaped, or slit-like or slit-shaped, and via which a cleaning fluid flowing through the flow channel structure can escape. Thus, a cleaning fluid can flow through the receiving elements 5, 6, through the flow channel structure typically comprising one or more flow channels that pass through the respective receiving element, in particular in the longitudinal direction. It is clear that respective outlet openings 5.1, 6.1 can be arranged or formed at different axial and/or peripheral direction-related positions with respect to a longitudinal axis of the respective receiving elements 5, 6. In particular, an axially oriented outlet opening at or in the region of a free end of a respective receiving element 5, 6 is also conceivable. Respective outlet openings 5.1, 6.1 can be arranged or formed so as to extend, in particular in a uniformly or non-uniformly distributed manner, at least in portions, optionally completely, over a respective receiving element 5, 6. In this way, a desired cleaning effect for different components of a shisha that are to be cleaned can be ensured.

It is clear on the basis of the figures that the strut-like or strut-shaped receiving elements 5, 6 can be configured, in the region of an end remote from a free end, having an enlarged cross-sectional geometry that forms a clamping or bracing portion 6.2 for clamping or bracing a mouthpiece 2 and/or pipe 3 of a shisha that is to be cleaned. An enlarged cross-sectional geometry of respective receiving elements 5, 6 can be implemented in particular by an enlargement of the outside diameter, a respective receiving element 5, 6 can accordingly have at least two different outside diameters. Even if corresponding clamping or bracing portions 6.2 are shown in the figures only for the receiving elements 6, these could alternatively or additionally also be provided for the receiving elements 5.

It is furthermore visible from the figures that the strut-like or strut-shaped receiving elements 5, 6 can comprise a stop element 5.2, in the region of an end remote from a free end, which stop element forms a stop surface for a mouthpiece 2 and/or a pipe 3 of a shisha that is to be cleaned and that is received on the respective receiving element 5, 6. Providing corresponding stop elements 5.2 also contributes to stable storage of the components of a shisha that are to be cleaned. Even if corresponding stop elements 5.2 are shown in the figures only for the receiving elements 5, these could alternatively or additionally also be provided for the receiving elements 6.

The carrier portions 9 can also comprise a flow channel structure (not shown) through which a cleaning fluid can flow. Therefore, a cleaning fluid can also be able to flow through the carrier portions 9. In particular, respective flow channel structures on the carrier portion side can communicate with respective flow channel structures on the receiving element side.

The figures show that the carrier portion 9 is arranged or formed on a base portion 10 of the basket-like frame construction 4, wherein the base portion also comprises a flow channel structure (not shown) through which a cleaning fluid can flow. The flow channel structure on the base portion side can communicate with respective flow channel structures on the carrier portion side.

It is thus possible to implement a superordinate flow channel structure which passes through the basket-like frame construction 4 at least in portions, since a respective carrier portion 9 likewise comprises a flow channel structure through which a cleaning fluid can flow, which structure can communicate with respective flow channel structures on the receiving element side, such that a cleaning fluid flowing through the flow channel structure on the carrier portion side can flow from the flow channel structure on the carrier portion side into at least one flow channel structure on the receiving element side. The flow channel structure on the carrier element side can accordingly serve as a distributor structure with respect to the flow channel structures on the receiving element side.

Furthermore, a cleaning fluid flowing through the flow channel structure on the base portion side can flow from the flow channel structure on the base portion side into at least one flow channel structure on the carrier portion side. The flow channel structure on the base portion side can accordingly serve as a distributor structure with respect to the flow channel structures on the carrier portion side. The flow channel structure on the base portion side can comprise a central inflow opening 11 for inflow of a cleaning fluid into the flow channel structure on the base portion side, and further into the flow channel structures on the carrier portion side, which communicate directly or indirectly therewith, and correspondingly into the flow channel structures on the receiving element side.

It is furthermore visible from the figures that a plurality of receiving elements 5, 6 can be arranged side-by-side on a carrier portion 9, in at least one row, forming a receiving element group G1, G2. This results in an arrangement of the receiving elements 5, 6 which is particularly expedient in view of practical fitting of the basket-like frame construction 4 with components of a shisha that are to be cleaned.

The figures show in particular that a first receiving element group G1 can comprise a plurality of receiving elements 5 that are arranged side-by-side on a first carrier portion 9 in at least one row, in a first angular orientation, and a second receiving element group G2 which can comprise a plurality of receiving elements 6 that are arranged side-by-side on a second carrier portion 9 in at least one row, in a first angular orientation. The first receiving element group G1 can be arranged on a first side of a base portion 10, in particular in the region of a first free end of the base portion 10. The second receiving element group G2 can be arranged on a second side of the base portion 10 that is opposite the first side, in particular in the region of a second free end of the base portion 10 opposite the first free end. This results in the arrangement of the strut-like receiving elements 5, 6, shown in the figures, which is expedient with respect to space requirements and cleaning efficiency.

It is clear from the figures that the basket-like frame construction 4 comprises a plurality of frame elements 4.2 (these can also be referred to as auxiliary frame elements) which are arranged in an angled manner, in particular in a right-angled manner, on a vertically oriented rod-like or rod-shaped frame element 4.1, in particular in a spiral staircase-like manner, at different axial and/or peripheral direction-related positions with respect to a frame element axis defined by the rod-shaped or rod-like frame element 4.1. Respective frame elements 4.1 can comprise first frame element portions 4.2.1 which extend at an angle, in particular at a right angle or substantially at a right angle, relative to the frame element axis, and second frame element portions 4.2.2 which extend in parallel or substantially in parallel relative to the frame element axis. Respective frame elements 4.2 can accordingly have an L-like or L-shaped basic shape. In this way, as shown in FIG. 2, the coil-like or spiral staircase-like arrangement of respective frame elements 4.2 efficiently provides space for the storage of pipes 3 of a shisha, since these can be stored in a coil-like manner over a plurality of spatial planes. FIG. 2 shows that, in this case, at least one free end of a respective pipe 3 can, as mentioned, be arranged on a corresponding receiving element 6, for example by being pushed on.

The figures finally show that the basket-like frame construction 4 can comprise one or more wheel or roller elements 12, via which the frame construction 4 can be movably mounted on a substrate for example. Corresponding wheel or roller elements 12 typically also make it possible for the basket-like frame construction 4 to be moved into and out of the receiving chamber 7 of the receiving device 8.

The device 1 described in conjunction with the figures makes it possible to implement a method for cleaning at least one mouthpiece and/or pipe of a shisha.

The invention claimed is:

1. A device for fluid flow-based cleaning of mouthpieces or pipes of a shisha, comprising:

a basket-like frame construction for storage of mouthpieces and/or pipes of the shisha that are to be cleaned in a fluid flow-based manner, wherein the basket-like frame construction comprises one or more strut-like or strut-shaped receiving elements for receiving the mouthpiece and/or pipe of the shisha that are to be cleaned in the fluid flow-based manner, wherein the strut- like receiving elements can be or are arranged at an angle of between 5 and 45° relative to a horizontally oriented reference plane; and a receiving device that is configured as a receiving chamber for receiving the basket-like frame construction, wherein a plurality of the one or more strut-like or strut-shaped receiving elements are arranged side-by-side on a carrier portion, in at least one row, forming a receiving element group, and wherein the carrier portion comprises a flow channel structure through which a cleaning fluid can flow.

2. The device according to claim 1, wherein the strut-like receiving elements each comprise a flow channel structure through which a cleaning fluid can flow, and one or more outlet openings which communicate with the flow channel structure and which are hole-like or hole-shaped or slit-like or slit-shaped, and via which the cleaning fluid flowing through the flow channel structure can escape.

3. The device according to claim 1, wherein the strut-like receiving elements are of a length in a range between 10 cm and 40 cm.

4. The device according to claim 1, wherein the strut-like or strut-shaped receiving elements are configured, in a region of an end remote from a free end, having an enlarged cross-sectional geometry that forms a clamping or bracing portion for clamping or bracing the mouthpiece and/or pipe of the shisha that is to be cleaned.

5. The device according to claim 1, wherein the strut-like or strut-shaped receiving elements are configured, in a region of an end remote from a free end, having a stop element that forms a stop surface for the mouthpiece and/or pipe of the shisha that is to be cleaned and that is received on the respective receiving element.

6. The device according to claim 1, wherein the flow channel structure on a carrier portion side communicates with at least one flow channel structure on a receiving element side.

7. The device according to claim 1, wherein the carrier portion is arranged or formed on a base portion of the basket-like frame construction, and the base portion comprises a flow channel structure through which the cleaning fluid can flow.

8. The device according to claim 7, wherein the flow channel structure on a base portion side communicates with at least one flow channel structure on the carrier portion side.

9. The device according to claim 1, further comprising a receiving element group which comprises a plurality of receiving elements that are arranged side-by-side on a first carrier portion in at least one row, in a first angular orientation, and at least one second receiving element group which comprises a plurality of receiving elements that are arranged side-by-side on a second carrier portion in at least one row, in a first angular orientation.

10. The device according to claim 1, wherein the basket-like frame construction comprises a plurality of frame elements which are arranged in an angled manner on a vertically oriented rod-like or rod-shaped frame element at different axial and/or peripheral direction-related positions with respect to a frame element axis defined by the rod-shaped or rod-like frame element.

11. A basket-like frame construction for the device according to claim 1.

12. A method for cleaning at least one mouthpiece and/or at least one pipe of the shisha, wherein the device according to claim 1 is used for carrying out the method.

* * * * *